9810X
Hopper & Doty.
Clover Huller.
Patented Jun. 30, 1836
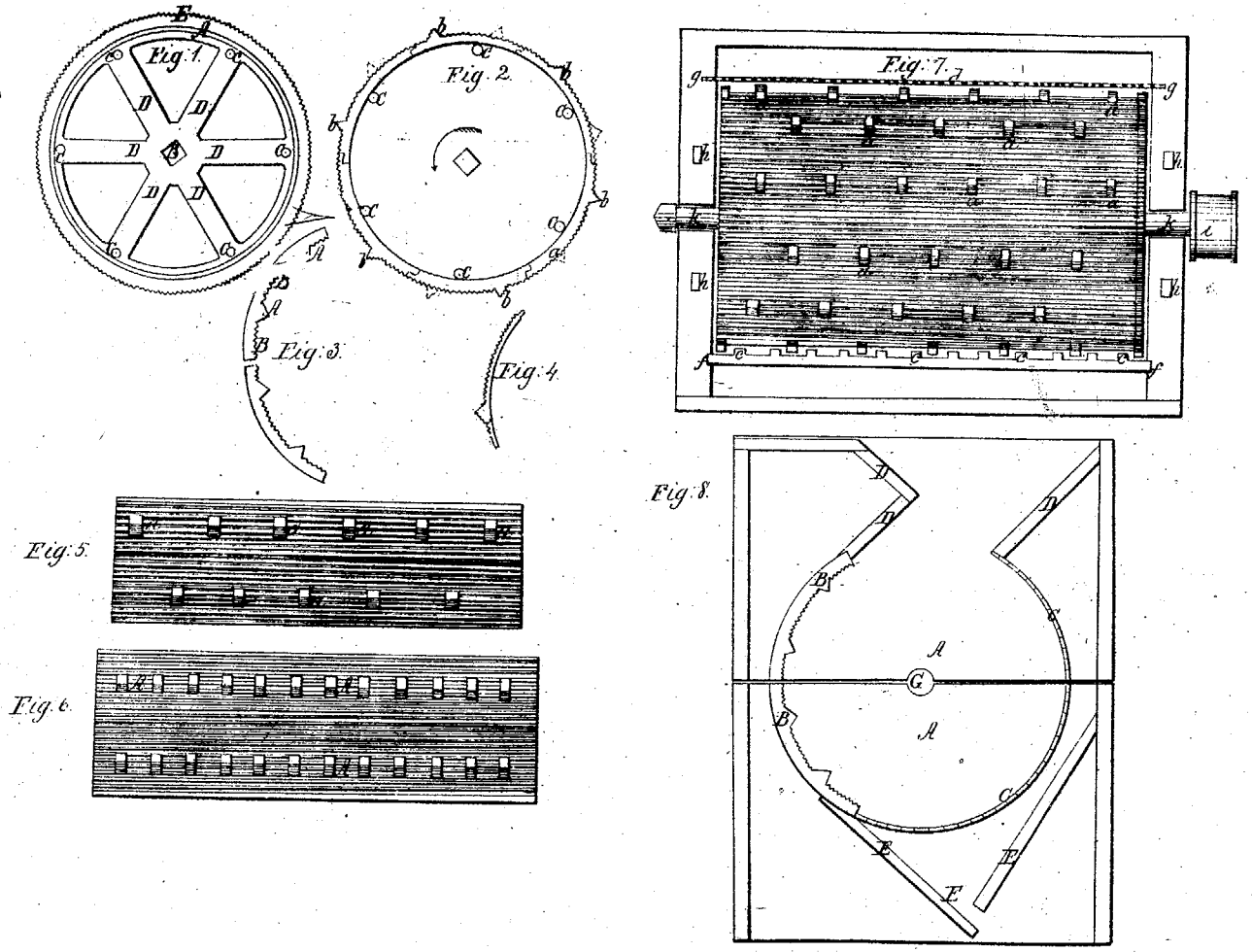

June 30. 1836 9810X 36

John Hopper & Andrew Doutty, of Moresburgh — State of Pennsylvania —

Letters Patent

The schedule referred to in these Letters Patent and making part of the same, containing a description in the words of the said John Hopper & Andrew Doughty themselves of their improvement in the Machine for Hulling Clover Seed —

Be it Known that we John Hopper and Andrew Douty of Moresburgh in the County of Columbia and State of Pennsylv^a have invented an imp^t in the "Clover Huller" viz This Machine consists of a cast iron cylinder furnished with triangular teeth, a cast iron concave, also furnished with triangular teeth, a [illegible] a shaft, through the cylinder with a whirl on one end of the shaft, hopperboards, and tail boards, — all of which are placed in a wooden or plank frame, consisting of two parts (an upper and lower) which separate horizontally about the centre, The cylinder is hollow about eighteen inches in diameter, and may be made thirty inches in length, more or less, to suit the power to be applied or the inclination of the owner. It is composed of two cast iron heads, forming the ends and of six staves, the staves are put together by setting the ends thereof into a groove, cut in the rim of each head about three fourths of an inch from the out edge thereof; and when the staves and heads are thus fitted together, they are fastened together by six wrought iron rods passing through the heads, immediately within the circle of the staves; each rod having a head on one end, and a screw and burr on the other end, by which they are to be firmly screwed together, The convex surface of the cylinder is to be fluted longitudinally, and the outer edges of the heads are to be notched so as to correspond.

9810X with the fluting of the cylinder. The head consists of a rim about
two inches wide, six arms, and a circular piece in the centre, of
two or more inches radius, through which a square hole is left to
admit a shaft of suitable thickness for the cylinder to revolve on
and immediately within the groove above mentioned, and where
the arms unite with the rim, six circular holes are to be
made for the rods to pass through by which the several parts
of the cylinder are to be fastened together, each head with
all its arms, rim, groove, and the notches round the edge
is to be moulded and cast complete, The thickness of the
cast iron, in the heads and staves, to be about an half inch Each stave of the cylinder is to be curved to a radius
suited to the intended diameter, and to be wide enough to
form one sixth part of a circle exclusive of the lap at each
edge; and is to be furnished with triangular teeth set in
rows at a proper distance from each edge, in alternate order
so that the several teeth forming a longitudinal row shall
in making a revolution, work precisely between the tracks marked
out by the teeth of the adjacent row, The number of teeth
must be varied, to suit the length of the cylinder, And for
cleaning Clover seed, for which this is principally intended
the teeth of the cylinder and of the concave should work
within about a quarter of an inch of each other; and the teeth
of one should work within about a quarter of an inch of the
surface of the other, The teeth of the cylinder are to be sloped
back, and notched on the front, from the base to the vertical
angle. and they are to be three fourths of an inch high, The
notched rims of the heads extending also three fourths of an inch
above the surface of the cylinder are each intended to answer
the purpose, of a ring of teeth, — The concave consists of
two cast iron staves, half an inch thick, made to correspond
with the cylinder in curvature, the radius thereof being
one inch longer than that of the cylinder. The teeth are to be triangular and of the same length or height above the surface
with those of the cylinder. — Two rows of teeth are to be set in
regular order along each stave on the concave side. The
surface of the concave is also to be fluted longitudinally.
The staves of the concave are to be fixed with their ends into
grooves to be cut in the side planks of the frame, at a proper
distance from the centre of motion of the cylinder, one stave
in the lower part of the frame, and the other in the upper part
so that when the two parts are put together, the two staves shall
come in contact and form together, a segment of about one third
of a circle round the cylinder — One half being above, and the
other half below, the centre of the cylinder —

The screen is to consist of woven wire, or perforated
sheet iron, and is to be fixed into the frame in a manner simi-
lar to that described for fixing the concave, about two thirds
thereof is to be fixed into the lower part of the frame, forming
with the lower stave of the concave, a continued curve, of equal
radius with the outside of the concave, and making with the lower
half thereof a complete semicircle. the remaining part of the
screen is to be fixed in the upper part of the frame, so that
when put together it will continue the curve up to a horizontal
line with the top of the upper stave of the concave — the radius
of the curve formed by the upper part of the screen, gradually
increasing from the bottom upwards, so that the upper edge of
the screen may have ~~receded~~ about an inch further from
the centre than the lower edge is, in order to give more room
between the screen and the cylinder at that place.

The hopper boards are to be fixed also to the side planks
of the upper part of the frame and attached to the upper
edge of the concave, at one side, and to the upper edge of
the screen at the other side and to be so placed as to form
a kind of schute, to conduct one and confine whatever is
thrown into it to the action of the revolving cylinder 264 9810X The tail boards are to be placed below the screen that every thing
which passes through the screen may be conducted by them, through
the opening between them, to the winnowing fan, to be placed beneath
the machine. The frame is composed of timber or plank. The [illegible]
of the lower part upon which the cylinder revolves, should be from
two and a half to three inches thick every other part may be much
thinner, the parts of the frame are so constructed that they may
separate horizontally at the centre of the shaft, the upper part
carrying with it, when taken off, the upper stave of the concave,
the upper part of the screen, and the hopper boards, and leaving
all the cylinder, from the centre upwards, exposed to view and
free to be removed at pleasure. The upper and lower parts of
the frame are kept to their proper places, in relation to each
other, by dowels. The position of the cylinder when the ma-
chine is put together is horizontal, and it is nearly enclosed
in the inverted curve formed by the concave and the screen The motion of the cylinder must be so directed, that its
teeth and convex surface will pass the "concave," downward
and never in a contrary direction. The cylinder is to be put
in motion by means of a strap and a whirl or pulley attached
to one end of the shaft.

Explanation of the Drawings

Fig 1st represents the head of the cylinder of which A is the
groove. B. the square hole in which to insert the shaft c.c.c.c.c.c.
the six circular holes through which to pass the rods used for
fastening and holding the several parts of the cylinder together
D.D.D.D.D.D. the six arms. Two such heads are required for the
cylinder. The outer edge of the rim (E) is notched to answer
the purpose of a ring of teeth. Fig 2. Represents a transverse
section of the cylinder when put together, and cut through a
ring of teeth in which a,a,a,a,a,a, are the six staves showing
the lap of the edges and the fluting of the surface. b.b.b.b.b.b.
are a ring of teeth shaped back and notched in the front from (394) 9810X the base to the vertical angle; they are three forths of an inch in length from the surface of the cylinder to the verticle angle or point c,c,c,c,c,c, are the six iron rods used for fastening and holding the several parts of the cylinder together and are immediately within the ring or circle formed by the staves. d, the square shaft in the center - The dart (e) shows what direction ought to be given to the motion to suit the cut and shape of the teeth they being notched on the front. Fig. 3rd Represents a cross section of the "concave composed of the staves cut through a transverse row of teeth showing the shape of the teeth as at A, and the fluting of the concave surface as at B,B, &c Fig. 4th Represents a transverse section of a single stave of the cylinder. Fig 5 Is a convex view of a single stave of the cylinder showing the manner of distributing or placing the teeth upon it which are represented at a,a,a,a,a,a, &c. Fig. 6th Is a concave view of one stave of the concave showing the manner of distributing the upon it. The teeth appear in two regular rows, as at A,A,A,A,A, &c, Fig. 7th is a top view of the cylinder placed in the lower part of the plank frame, exhibiting the situation of the teeth on the cylinder, as at a,a,a,a,a,a,a, &c and the upper edge of the lower stave of the concave at b) with the upper row of teeth at c,c,c,c, &c and on the opposite side of the cylinder, the upper edg of the lower part of the screen d, e,e, are the end planks of the frame into which the ends of the concave are let at f,f, and into which the ends of the screen are let at g,g, - h,h,h,h, are mortices for the dowels which are fast to the upper part of the frame - i the whirl and k, k, the gudgeons upon which the cylinder turns.

Fig 8th Represents a transverse section of the frame including the concave, screen, hopper, boards, and tail boards, the cylinder being out A, A, are the side boards of the upper and part of the frame B. B. the upper and lower staves of the concave C, C, the upper and lower parts of the screen - D.D.D.

the hopper board E. E., the tail boards, F. the opening through which every thing which passes through the screen is conducted to the winnowing fan beneath the machine and G. a hole in the end for a gudgeon of the shaft to work in, When the cylinder is placed in as at fig. 7th and the upper part of the frame is put on, as at Fig 8th the machine is prepared for use.

Manner of using the mill or machine. When the machine is prepared as above described it is then adapted to the hulling of Clover seed only a quick revolving motion being communicated to the cylinder by means of a strap and wheel as aforesaid the hopper is to be filled with the chaff containing the seed, which must there be permitted to remain until it becomes fine enough to pass, (chaff and all) through the screen, and so down through the opening between the tail boards to the fan The operation is attended with no further trouble than that of keeping the hopper filled, and the process of hulling will be rapidly performed by the operation of the machine — In order to adapt it to the hulling or threshing of other seeds or grain, the upper part of concave and the whole of the screen must be removed,

What we claim as our invention is the manner of constructing the cylinder, (as we are aware that cylinders have been long in use, but not constructed after the manner of ours) We therefore claim the method of fluting the circumference, and the outer edges or periphery of the heads.

Secondly the manner of securing the staves and heads together by means of the wrought iron) rods as described Lastly the manner of combining the [illegible] and notched teeth with the fluted cylinder as set forth above.

In testimony that the above is a full description of our improvement as invented by us we have hereunto set our hands, Witnesses David Peterkin
Joseph Sholes John Hopper.
Andrew Doily.

[illegible] [illegible]